US012786352B2

(12) United States Patent
Daggubati

(10) Patent No.: US 12,786,352 B2
(45) Date of Patent: Nov. 3, 2026

(54) SYSTEM FOR PERSONALIZED USER ENGAGEMENT AND ASSISTANCE

(71) Applicant: Kishore Daggubati, Danville, CA (US)

(72) Inventor: Kishore Daggubati, Danville, CA (US)

( * ) Notice: Subject to any disclaimer, the term of this patent is extended or adjusted under 35 U.S.C. 154(b) by 447 days.

(21) Appl. No.: 18/477,562

(22) Filed: Sep. 29, 2023

(65) Prior Publication Data

US 2025/0113013 A1 Apr. 3, 2025

(51) Int. Cl.
*H04N 7/15* (2006.01)

(52) U.S. Cl.
CPC .................................. *H04N 7/157* (2013.01)

(58) Field of Classification Search
CPC ................................ H04N 7/157; H04N 7/15
See application file for complete search history.

(56) References Cited

U.S. PATENT DOCUMENTS 11,562,657 B1 * 1/2023 Fieldman ................ G09B 5/14
2004/0267938 A1 * 12/2004 Shoroff ................ H04L 63/104 709/227
2012/0101865 A1 * 4/2012 Zhakov ........... G06Q 10/06311 705/7.42
2016/0132847 A1 * 5/2016 Sarris ................ G06Q 20/1085 705/42
2016/0234264 A1 * 8/2016 Coffman ............ H04L 65/4015
2017/0221073 A1 * 8/2017 Orsolini .............. G06Q 30/016
2021/0377280 A1 12/2021 Daggubati
2022/0067666 A1 * 3/2022 Shiner ................. G06Q 10/103
2022/0141269 A1 5/2022 Daggubati
2022/0276879 A1 * 9/2022 Rajagopal .......... G06F 16/9537
2022/0353468 A1 * 11/2022 Walia ..................... H04N 7/147
2024/0187525 A1 * 6/2024 Chau ..................... H04M 3/564
2024/0244162 A1 * 7/2024 Farmer ................ H04L 51/046

* cited by examiner

*Primary Examiner* — Mahelet Shiberou

(57) ABSTRACT

A system for personalized user engagement and assistance is disclosed. The system comprises a first agent processing system associated with a first agent, a second agent processing system associated with a second agent, a first user processing system associated with a first user, and a server. The server comprising one or more processors is configured to host a first virtual room and a second virtual room created by the first agent processing system and second agent processing system, respectively. The server is configured to provide the first user access to the first virtual lounge. Upon receiving a first input from the first agent processing system, the server is configured to establish a secured connection between the first user processing system and the first agent processing system and allow the first user into the first virtual room.

19 Claims, 8 Drawing Sheets

SYSTEM FOR PERSONALIZED USER ENGAGEMENT AND ASSISTANCE

FIELD OF THE INVENTION

This application relates generally to the field of personalized user engagement and assistance, and more particularly, the system relates to providing personalized support, over a video call, to the user requesting assistance.

BRIEF STATEMENT OF THE PRIOR ART

User engagement and assistance is a critical aspect of any business that provides goods or services to a user (also referred as 'customer'). The effectiveness and efficiency of interactions with the customers can significantly impact customer satisfaction, brand loyalty, and overall business success. Traditionally, user engagement and assistance has been conducted via telephone, email, or chat, often lacking the personalized and engaging qualities of face-to-face interactions.

With the advent of video communication technologies, companies have increasingly adopted video-based user engagement and assistance as a means to bridge the gap between in-person and remote assistance. However, conventional video support systems are often limited in their ability to recreate the nuanced and collaborative aspects of in-person interactions, which can hinder the user engagement and assistance process.

Furthermore, in the era of remote work and distributed teams, companies face the challenge of ensuring seamless collaboration among customer support agents, who may be geographically dispersed. The need for a cohesive and efficient support environment for both agents and customers remains a paramount concern.

Hence, there exists a compelling need for an innovative approach that harnesses the power of video customer support, leverages visual communication to enhance the efficiency and effectiveness of user engagement and assistance while considering the varying constraints and preferences of different customer segments.

SUMMARY OF THE INVENTION

In an embodiment, a system for personalized user engagement and assistance. The system comprises a first agent processing system associated with a first agent, a second agent processing system associated with a second agent, a first user processing system associated with a first user, and a server. The first agent processing system is configured to create a first virtual room uniquely associated with the first agent. The second agent processing system is configured to create a second virtual room uniquely associated with the second agent. The server comprising one or more processors is configured to host the first virtual room and the second virtual room created by the first agent processing system and second agent processing system, respectively. Further, the system is configured to create a first virtual lounge associated with the first virtual room and the second virtual room. Upon establishing a secured connection between the first user processing system and the server, the server is configured to provide the first user access to the first virtual lounge. Upon receiving a first input from any one of the first agent processing system or the second agent processing system, the server is configured to establish a secured connection between the first user processing system and any one of the first agent processing system or the second agent processing system and allow the first user into the first virtual room.

BRIEF DESCRIPTION OF DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1:
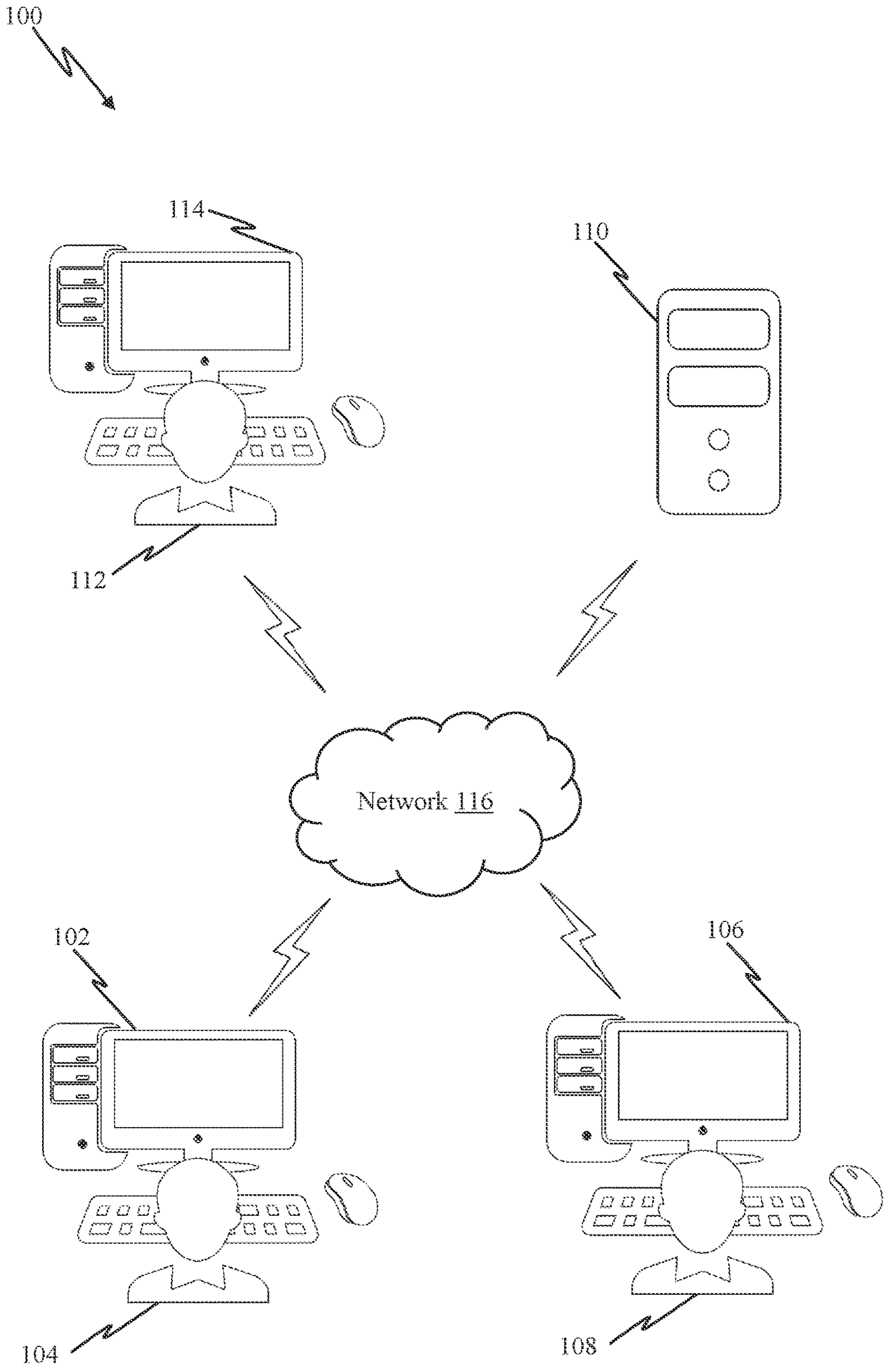
FIG. 1 illustrates a system 100 for personalized user engagement and assistance via virtual rooms, in accordance with an embodiment.

FIG. 1 illustrates a system 100 for personalized user engagement and assistance via virtual rooms, in accordance with an embodiment. The system 100 may comprise of a first agent processing system 102, a second agent processing system 106, a first user processing system 114, and a server 110. The first agent processing system 102 may be associated with a first agent 104 and the second agent processing system 106 may be associated with a second agent 108. The first user processing system 114 may be associated with a first user 112. The server 110 may be configured to coordinate a secured connection between the first user processing system 114, the first agent processing system 102, and/or the second agent processing system 106. The first user processing system 114, the first agent processing system 102, the second agent processing system 106 and the server 110 may further be connected and may be configured to communicate with each other through a network 116. The network 116 may be, but not limited to, a local area network, wide area network or a metropolitan area network.

In another embodiment, the system 100 may comprise of a third agent processing system associated with a third agent, a fourth agent processing system associated with a fourth agent user, and so on (not shown in the figures).

In an embodiment, the system 100 may comprise of a second user processing system, wherein the second user processing system may be associated with a second user, a third user processing system, wherein the third user processing system may be associated with a third user, a fourth user processing system, wherein the fourth user processing system may be associated with a fourth user, and so on (not shown in the figures).

Figure 2:
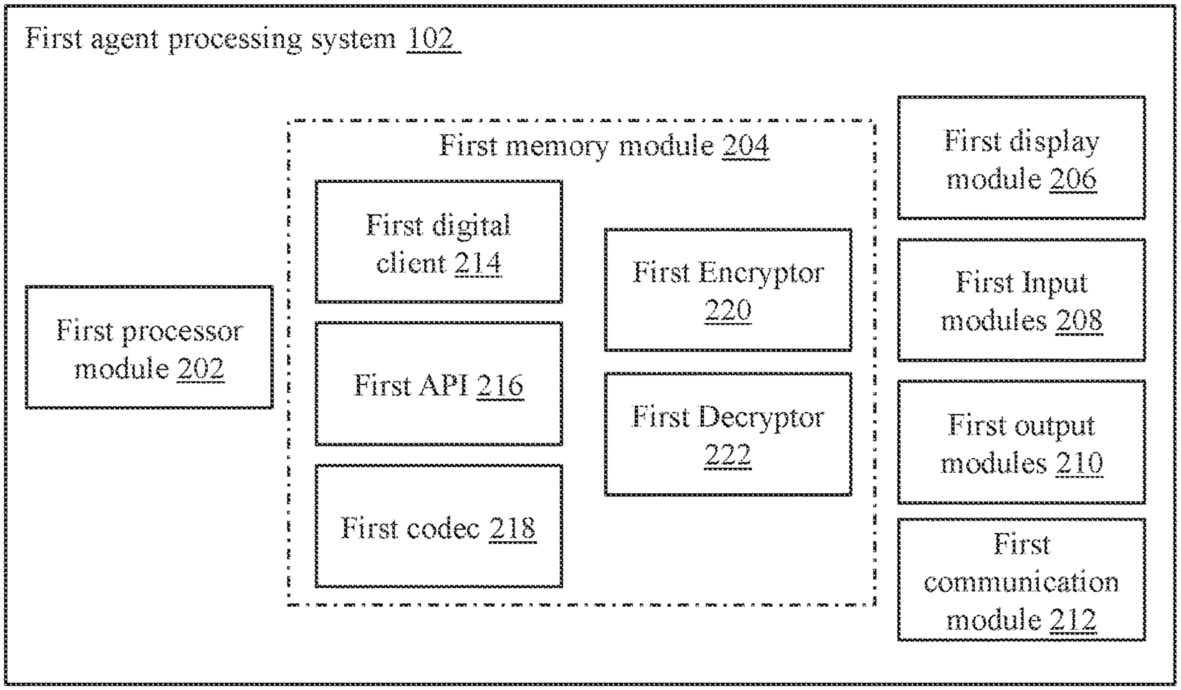
FIG. 2 is a block diagram illustrating architecture of a first agent processing system 102, in accordance with an embodiment.

FIG. 2 is a block diagram illustrating architecture of the first agent processing system 102, in accordance with an embodiment. The first agent processing system 102 may comprise of a first processor module 202, a first memory module 204, a first display module 206, first input modules 208, first output modules 210, and a first communication module 212.

The first processor module 202 may be implemented in the form of one or more processors and may be implemented as appropriate in hardware, computer-executable instructions, firmware, or combinations thereof. Computer-executable instruction or firmware implementations of the first processor module 202 may include computer-executable or machine-executable instructions written in any suitable programming language to perform the various functions described.

The first memory module 204 may include a permanent memory such as hard disk drive, may be configured to store data, and executable program instructions that are implemented by the first processor module 202. The first memory module 204 may be implemented in the form of a primary and a secondary memory. The first memory module 204 may store additional data and program instructions that are loadable and executable on the first processor module 202, as well as data generated during the execution of these programs. Further, the first memory module 204 may be a volatile memory, such as random-access memory and/or a disk drive, or a non-volatile memory. The first memory module 204 may comprise of removable memory such as a Compact Flash card, Memory Stick, Smart Media, Multimedia Card, Secure Digital memory, or any other memory storage that exists currently or may exist in the future.

In an embodiment, the first memory module 204 may further comprise of a first digital client 214, a first Application Programming Interface (API) 216, a first codec 218, a first encryptor 220, and a first decryptor 222. The first digital client 214 may be a web browser or a software application enables video conferencing, wherein the first digital client 214 may further comprise a first digital client display interface. The first digital client display interface may enable the interaction of the first user 112 with the first agent processing system 102. The first codec 218 may include computer-executable or machine-executable instructions written in any suitable programming language to compress outgoing data and decompress incoming data. The first encryptor 220 may encrypt the data being sent and first decryptor 222 may decrypt the incoming data.

The first display module 206 may display an image, a video, or data to a user. For example, the first display module 206 may include a panel, and the panel may be an LCD, LED or an AM-OLED.

The first input modules 208 may provide an interface for input devices such as keypad, touch screen, mouse, and stylus among other input devices. In an embodiment, the first input module 208 includes a camera and a microphone.

The first output modules 210 may provide an interface for output devices such as display screen, speakers, printer, and haptic feedback devices, among other output devices.

The first communication module 212 may be used by the first agent processing system 102 to communicate with the server 110. The first communication module 212, as an example, may be a GPRS module, or other modules that enable wireless communication.

It may be noted that the second agent processing system 106, may have a similar architecture as that of the first agent processing system 102, and is therefore not described in detail for the sake of brevity.

In an embodiment, the third agent processing system, the fourth agent processing system, and so on, may have a similar architecture as that of the first agent processing system 102.

Figure 3:
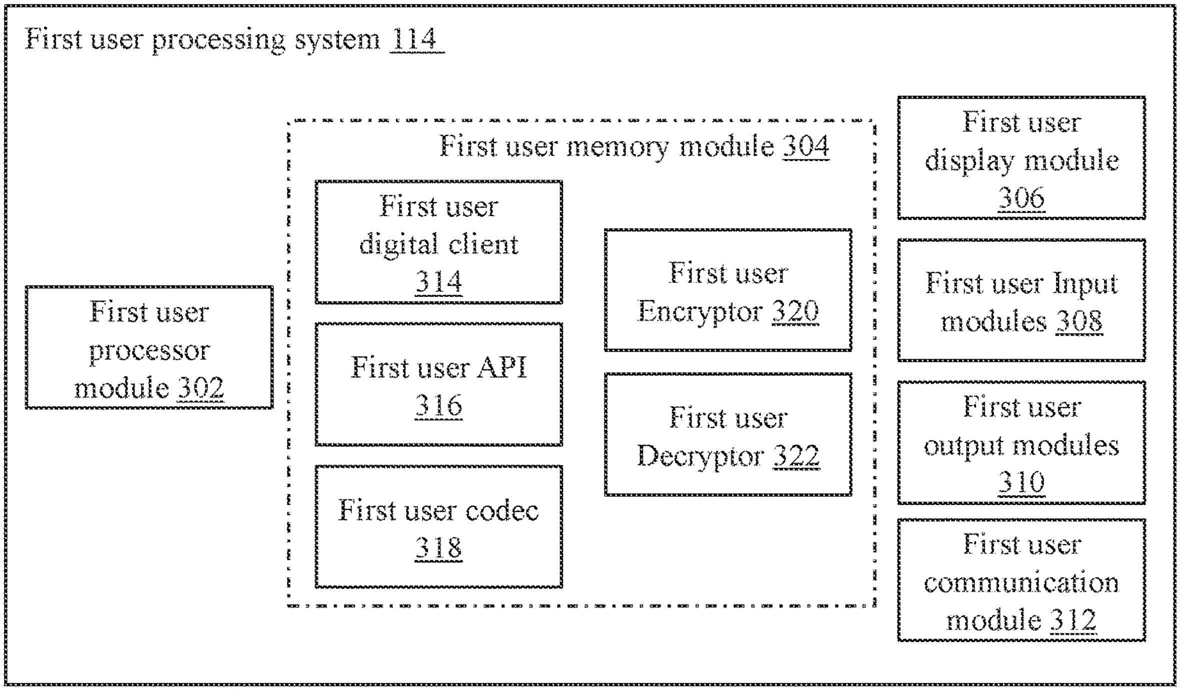
FIG. 3 is a block diagram illustrating architecture of a first user processing system 114, in accordance with an embodiment.

FIG. 3 is a block diagram illustrating architecture of the first user processing system 114, in accordance with an embodiment. The first user processing system 114 may comprise of a first user processor module 302, a first user memory module 304, a first user display module 306, first user input modules 308, first user output modules 310, and a first user communication module 312.

The first user processor module 302 may be implemented in the form of one or more processors and may be implemented as appropriate in hardware, computer-executable instructions, firmware, or combinations thereof. Computer-executable instruction or firmware implementations of the first user processor module 302 may include computer-executable or machine-executable instructions written in any suitable programming language to perform the various functions described.

The first user memory module 304 may include a permanent memory such as hard disk drive, may be configured to store data, and executable program instructions that are implemented by the first user processor module 302. The first user memory module 304 may be implemented in the form of a primary and a secondary memory. The first user memory module 304 may store additional data and program instructions that are loadable and executable on the first user processor module 302, as well as data generated during the execution of these programs. Further, the first user memory module 304 may be a volatile memory, such as random-access memory and/or a disk drive, or a non-volatile memory. The first user memory module 304 may comprise of removable memory such as a Compact Flash card, Memory Stick, Smart Media, Multimedia Card, Secure Digital memory, or any other memory storage that exists currently or may exist in the future.

In an embodiment, the first user memory module 304 may further comprise of a first user digital client 314, a first user Application Programming Interface (API) 316, a first user codec 318, a first user encryptor 320, and a first user decryptor 322. The first user digital client 314 may be a web browser or a software application enables video conferencing, wherein the first user digital client 314 may further comprise a first user digital client display interface. The first user digital client display interface may enable the interaction of the first user 112 with the first user processing system 114. The first user codec 318 may include computer-executable or machine-executable instructions written in any suitable programming language to compress outgoing data and decompress incoming data. The first user encryptor 320 may encrypt the data being sent and first user decryptor 322 may decrypt the incoming data.

The first user display module 306 may display an image, a video, or data to a user. For example, the first user display module 306 may include a panel, and the panel may be an LCD, LED or an AM-OLED.

The first user input modules 308 may provide an interface for input devices such as keypad, touch screen, mouse, and stylus among other input devices. In an embodiment, the first user input module 308 includes a camera and a microphone.

The first user output modules 310 may provide an interface for output devices such as display screen, speakers, printer, and haptic feedback devices, among other output devices.

The first user communication module 312 may be used by the first user processing system 114 to communicate with the server 110. The first user communication module 312, as an example, may be a GPRS module, or other modules that enable wireless communication.

In an embodiment, the second user processing system, the third user processing system, and so on, may have a similar architecture as that of the first user processing system 114.

Figure 4:
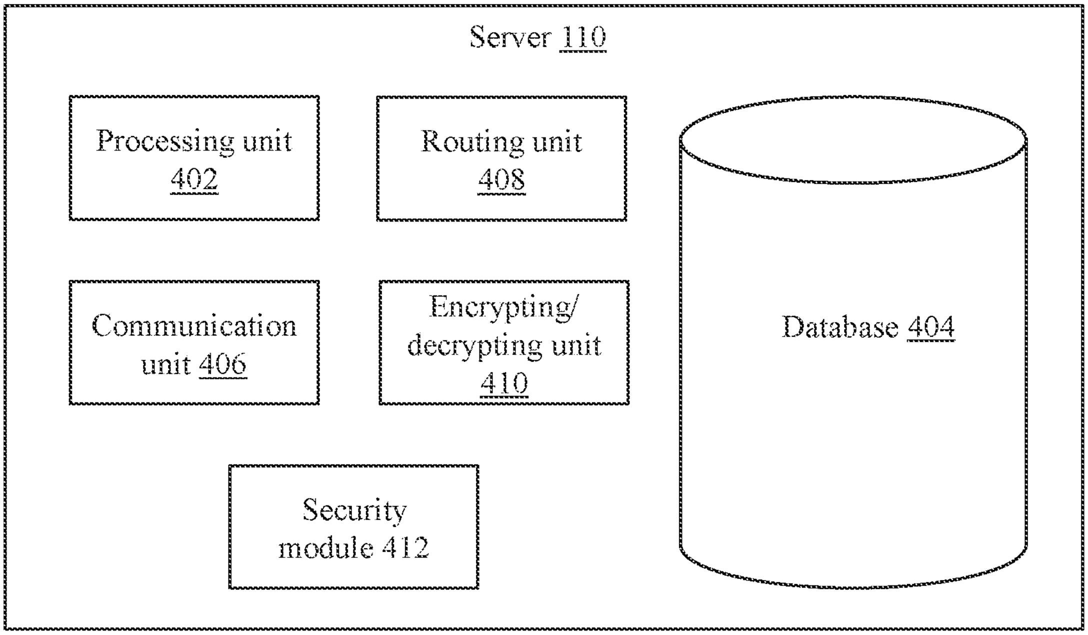
FIG. 4 is a block diagram illustrating architecture of a server 110, in accordance with an embodiment.

FIG. 4 is a block diagram illustrating architecture of the server 110, in accordance with an embodiment. The server 110 may comprise of a processing unit 402, a database 404, a communication unit 406, a routing unit 408, an encrypting/decrypting unit 410, and a security module 412.

The processing unit 402 may be implemented in the form of one or more processors and may be implemented as appropriate in hardware, computer-executable instructions, firmware, or combinations thereof. Computer-executable instruction or firmware implementations of the processing unit 402 may include computer-executable or machine-executable instructions written in any suitable programming language to perform the various functions described.

The database 404 may include a permanent memory such as hard disk drive, that may be configured to store data, and executable program instructions that are implemented by the processor module. The database 404 may be configured to store information related to the first agent 104, the second agent 108, the third agent, and so on, which may not be limited to email ID, phone number of the agents, information pertaining to the first agent processing system 102, the second agent processing system 106, third agent processing system and so on. Further, the database 404 may be configured to store information related to the first user 112, the second user, the third user, and so on, which may not be limited to email ID, phone number of the users, information pertaining to the first user processing system 114, the second user processing system, the third user processing system and so on.

The communication unit 406 may be used by the server 110 to communicate with a plurality of agent processing systems (such as the first agent processing system 102, the second agent processing system 106, and so on), and a plurality of user processing systems (such as the first user processing system 114, the second user processing system, and so on). The communication unit 406, as an example, may be a GPRS module, or other modules that enable wireless communication.

The routing unit 408 may be configured to enable identification of the plurality of agent processing systems and the plurality of user processing systems to which the data must be transmitted.

The encrypting/decrypting unit 410 may be configured to decrypt the incoming data and encrypt the outgoing data from the server 110 from each of the plurality of agent processing systems and the plurality of user processing systems.

The security module 412 may be configured to authenticate each of plurality of agents (such as the first agent 104, the second agent 108, and so on) and a plurality of users (such as the first user 112, second user, and so on) associated with each of the plurality of agent processing systems and the plurality of user processing systems, respectively, before establishing a connection.

Figure 5:
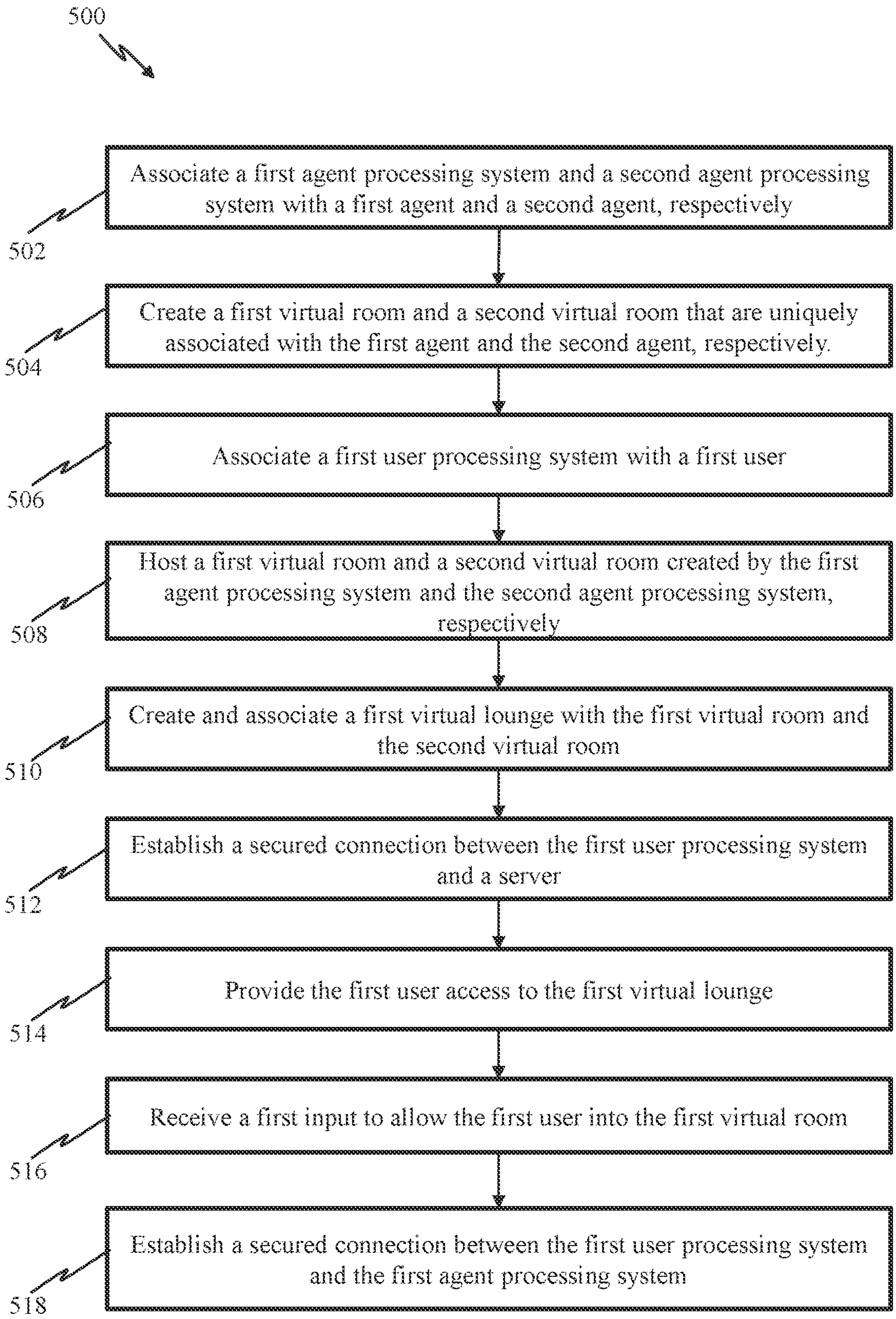
FIG. 5 is a flowchart 500 illustrating establishing a secured connection between the first user processing system 114 and the first agent processing system 102, in accordance with an embodiment.

FIG. 5 is a flowchart 500 illustrating the steps involved in establishing a secured connection between the first user processing system 114 and the first agent processing system 102, in accordance with an embodiment. At step 502, the server 110 may be configured to associate the first agent processing system 102 and the second agent processing system 106 with the first agent 104 and the second agent 108, respectively.

At step 504, the server 110 may be configured to create a first virtual room uniquely associated with the first agent 104 and create a second virtual room uniquely associated with the second agent 108.

At step 506, the server 110 may be configured to associate the first user processing system 114 with the first user 112.

At step 508, the server 110 may be configured to host the first virtual room and the second virtual room created by the first agent processing system 102 and the second agent processing system 106, respectively.

At step 510, the server 110 may be configured to create a first virtual lounge and associate said first virtual lounge with the first virtual room and the second virtual room.

At step 512, the server 110 may be configured to establish a secured connection between the first user processing system 114 and the server 110.

At step 514, upon establishing the secured connection, the server 110 may be configured to provide the first user 112 access to the first virtual lounge. Further, the server 110 may be configured to allow the first user 112 into the first virtual lounge.

At step 516, the server 110 may be configured to receive a first input from the first agent processing system 102, wherein the first input may comprise of instructions to allow the first user 112 into the first virtual room from the first virtual lounge.

In an embodiment, the server 110 may be configured to receive the first input from the second agent processing system 106, allowing the first user 112 into the second virtual room.

At step 518, the server 110 may be configured to establish a secured connection between the first user processing system 114 and the first agent processing system 102.

In an embodiment, the server 110 may be configured to establish a secured connection between the first user processing system 114 and the second agent processing system 106.

In an embodiment, the server 110 may be configured to monitor the one or more virtual lounges to detect the presence of the plurality of users. Upon detecting the presence of the first user 112 among the plurality of users in the first virtual lounge, the server 110 may be configured to notify the first agent 104 and the second agent 108 of the presence of the first user 112 in the first virtual lounge. The server 110 may further be configured to notify through means of, but not limited to, an Email, a text message or a call.

In an embodiment, the server 110 may be configured to notify the second agent 108 when the first user 112 leaves the first virtual lounge. Further, the server 110 may be configured to notify the second agent 108 when the first user 112 enters the first virtual room.

In an embodiment, the system 100 may comprise of one or more virtual lounges, wherein each of the virtual lounge may be associated with one or more virtual rooms (such as the first virtual room, and the second virtual room may be associated with the first virtual lounge and so on).

Figure 6:
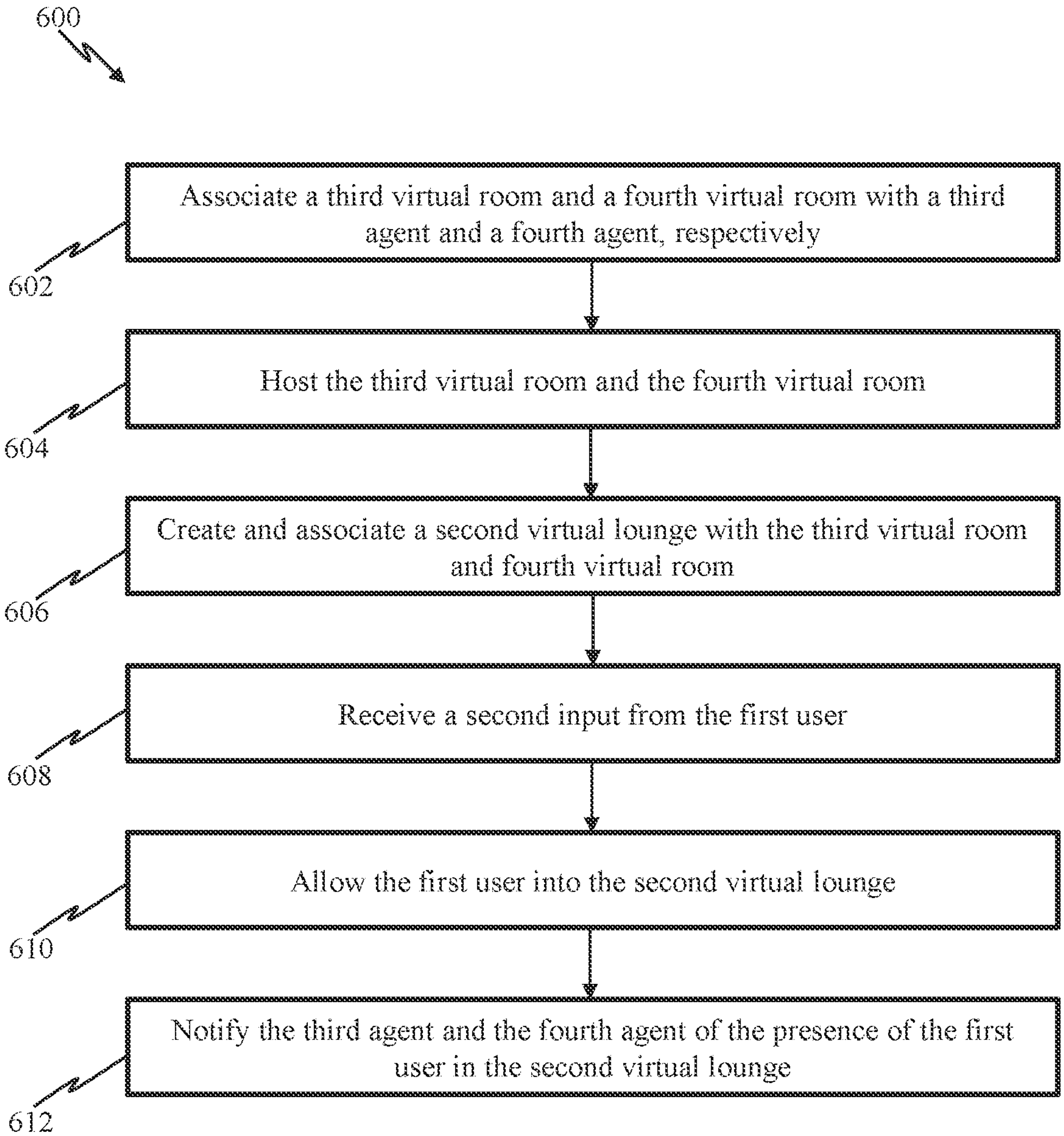
FIG. 6 is a flowchart 600 illustrating enabling first user 112 to access a second virtual lounge, in accordance with an embodiment.

FIG. 6 is a flowchart 600 illustrating the steps involved in enabling the first user 112 to access a second virtual lounge, in accordance with an embodiment. At step 602, the server 110 may be configured to associate the third agent processing system and the fourth agent processing system with the third agent, and the fourth agent, respectively. The third agent processing system may be configured to create a third virtual room uniquely associated with the third agent. Similarly, the fourth agent processing system may be configured to create a fourth virtual room uniquely associated with the fourth agent.

At step 604, the server 110 may be configured to host the third virtual room and the fourth virtual room created by the third agent processing system and fourth agent processing system, respectively.

At step 606, the server 110 may be configured to create a second virtual lounge. Further, the server 110 may be configured to associate the third virtual room and the fourth virtual room with the second virtual lounge.

At step 608, the server 110 may be configured to receive a second input from the first user 112. The second input may include, but not limited to, a request from the first user 112 to enter a specific virtual lounge among the one or more virtual lounges.

In an embodiment, the server 110 may be configured to retrieve stored user preferences from the database 404, and/or retrieve history of video calls between the first user 112 and anyone of the plurality of agents. Further, the server 110 may be configured to allow the first user 112 into the first virtual lounge or the second virtual lounge based on said retrieved data.

At step 610, upon receiving a request to enter the second virtual lounge, the server 110 may be configured to allow the first user 112 into the second virtual lounge.

In an embodiment, upon receiving a request to enter the first virtual lounge, the server 110 may be configured to allow the first user 112 into the first virtual lounge.

At step 612, upon detecting the presence of the first user 112 in the second virtual lounge, the server 110 may be configured to notify the third agent and the fourth agent of the presence of the first user 112 in the second virtual lounge.

Figure 7:
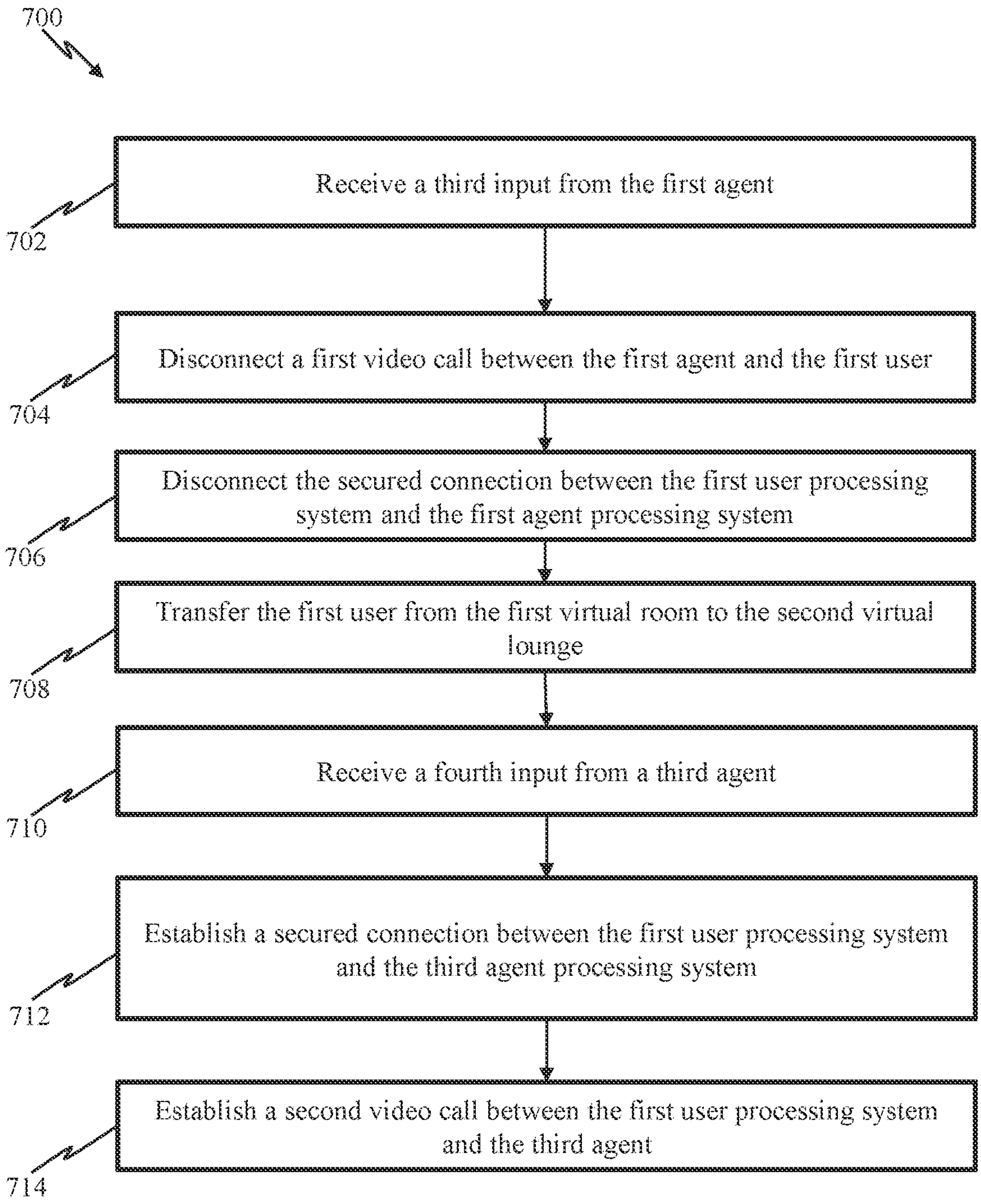
FIG. 7 is a flowchart 700 illustrating transfer of the first user 112 from first virtual room to the second virtual lounge, by the server 110, in accordance with an embodiment.

FIG. 7 is a flowchart 700 illustrating the steps involved in transfer of the first user 112 from first virtual room to the second virtual lounge, by the server 110, in accordance with an embodiment. At step 702, the server 110 may be configured to receive a third input from the first agent 104. The third input may comprise of an instruction from the first agent 104 to transfer the first user 112 to the second virtual room among the one or more virtual rooms or to the second virtual lounge among one or more virtual lounges, and/or disconnect the call.

At step 704, upon receiving the third input from the first agent 104, the server 110 may be configured to disconnect the first video call between the first agent 104 and the first user 112.

At step 706, the server 110 may be configured to disconnect the secured connection between the first user processing system 114 and the first agent processing system 102.

At step 708, the server 110 may be configured to transfer the first user 112 from the first virtual room to the second virtual lounge.

At step 710, the server 110 may be configured to receive a fourth input from the third agent allowing the first user 112 into the third virtual lounge.

In an embodiment, the fourth input may be an instruction from the fourth agent allowing the first user 112 into the fourth virtual room.

At step 712, upon receiving the fourth input from the third agent, the server 110 may be configured to establish the secured connection between the first user processing system 114 and the third agent processing system.

In an embodiment, upon receiving the fourth input from the fourth agent, the server 110 may be configured to establish a secured connection between the first user processing system 114 and the fourth agent processing system.

At step 714, the server 110 may be configured to establish a second video call between the first user processing system 114 and the third agent processing system.

In an embodiment, the server 110 may be configured to establish a second video call between the first user processing system 114 and the fourth agent processing system.

Figure 8:
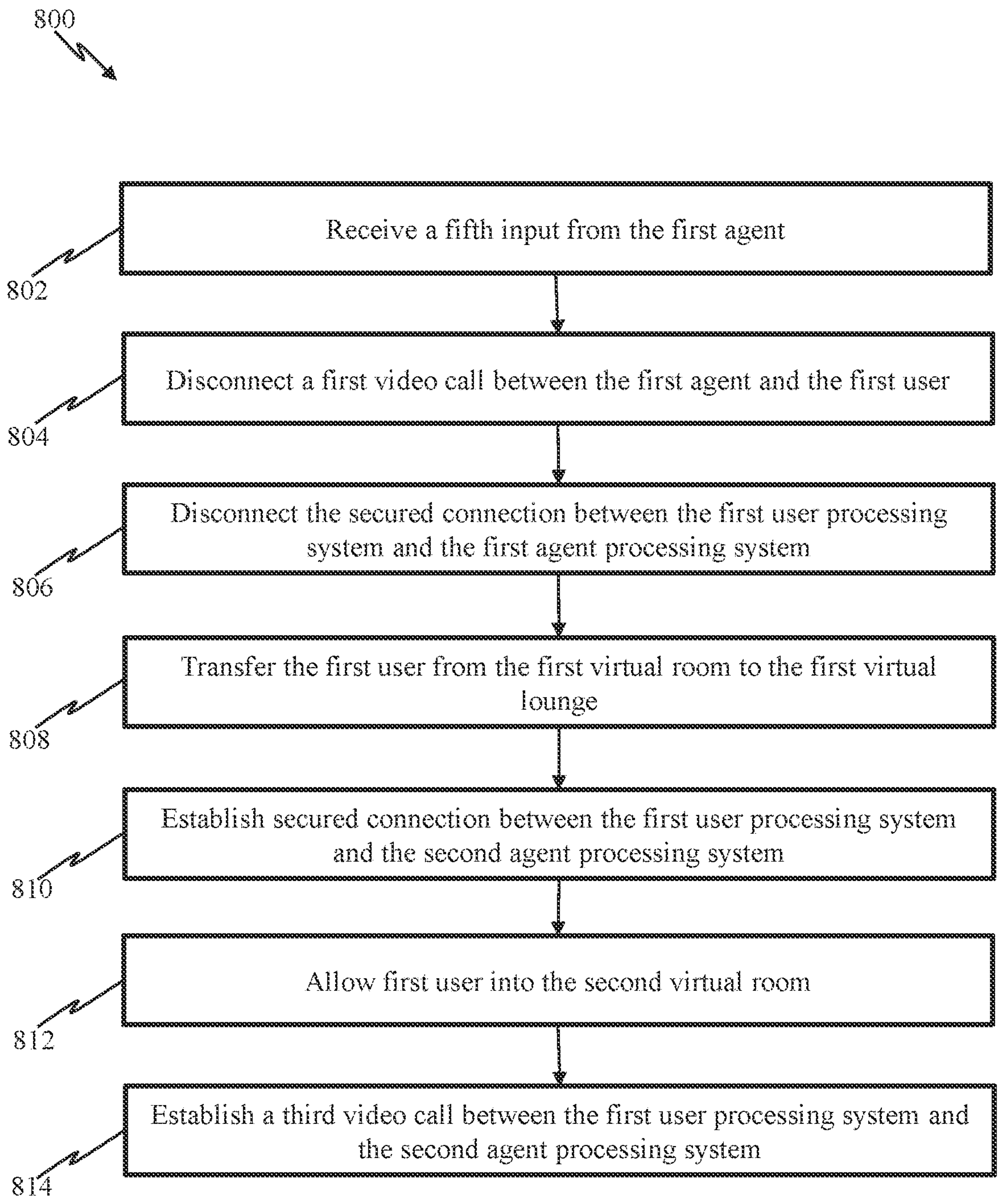
FIG. 8 is a flowchart 800 illustrating redirecting of the first user 112 to the second virtual room from the first virtual room, in accordance with an embodiment.

FIG. 8 is a flowchart 800 illustrating the steps involved in redirecting of the first user 112 to the second virtual room from the first virtual room, in accordance with an embodiment. At step 802, the server 110 may be configured to receive a fifth input from the first agent 104. The fifth input may comprise of an instruction from the first agent 104 to transfer the first user 112 to the second virtual room among the one or more virtual rooms, and/or disconnect the call.

At step 804, upon receiving the fifth input from the first agent 104, the server 110 may be configured to disconnect the first video call between the first agent 104 and the first user 112.

At step 806, the server 110 may be configured to disconnect the secured connection between the first user processing system 114 and the first agent processing system 102.

At step 808, the server 110 may be configured to transfer the first user 112 from the first virtual room to the first virtual lounge.

In an embodiment, the server 110 may be configured to transfer the first user 112 from the first virtual room to the first second virtual room.

At step 810, the server 110 may be configured to establish a secured connection between the first user processing system 114 and the second agent processing system 106.

At step 812, the server 110 may be configured to allow the first user 112 into the second virtual room.

At step 814, the server 110 may be configured to establish the third video call between the first user processing system 114 and the second agent processing system 106.

Figure 9:
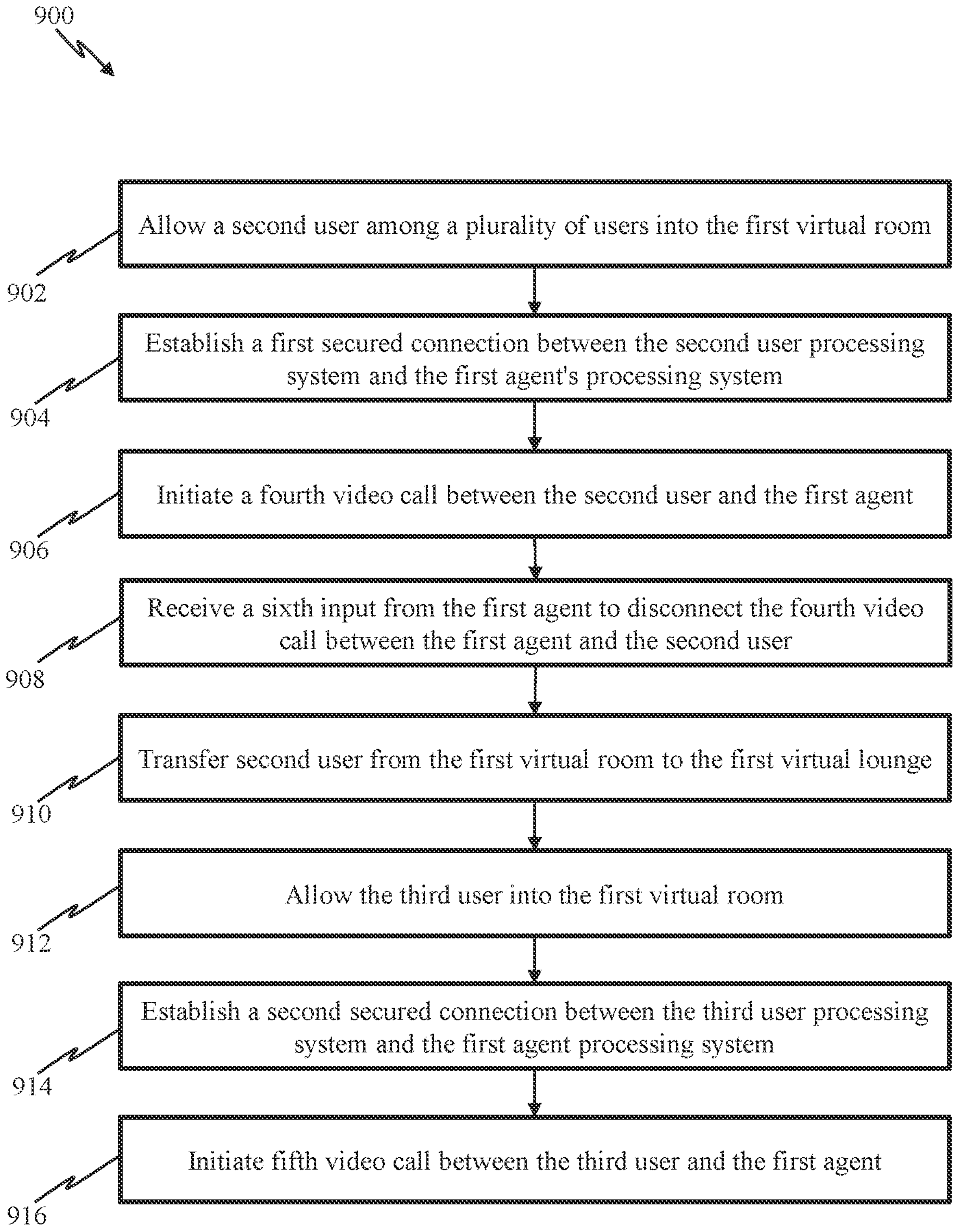
FIG. 9 is a flowchart 900 illustrating allowing a third user present in the first virtual lounge upon disconnecting a second user from first virtual room, in accordance with an embodiment.

FIG. 9 is a flowchart 900 illustrating the steps involved in allowing a third user present in the first virtual lounge upon disconnecting the second user from first virtual room, in accordance with an embodiment. At step 902, upon receiving a request from the first agent 104 for allowing the second user into the first virtual room, the server 110 may be configured to allow the second user among the plurality of users present in the first virtual lounge.

At step 904, the server 110 may be configured to establish a first secured connection between the second user processing system and the first agent processing system 102.

At step 906, the server 110 may be configured to initiate a fourth video call between the second user and the first agent 104.

At step 908, the server 110 may be configured to receive a sixth input from the first agent 104 to disconnect the fourth video call between the first agent 104 and the second user. The sixth input may comprise of an instruction from the first agent 104 to transfer the first user 112 to another virtual room or another virtual lounge from the one or more virtual room and one or more virtual lounges, respectively, and/or disconnect the call.

At step 910, upon receiving the sixth input from the from the first agent 104, the server 110 may be configured to transfer the second user from the first virtual room to the first virtual lounge.

At step 912, the server 110 may be configured to allow the third user among the plurality of users into the first virtual room.

At step 914, the server 110 may be configured to establish a second secured connection between third user processing system and the first agent processing system 102.

At step 916, upon allowing the third user into the first virtual room, the server 110 may be configured to initiate a fifth video call between the third user and the first agent 104.

In an embodiment, the server 110 may be configured to display the availability status of the plurality of agents and the availability status of the virtual room on the first user processing system 114. The status of first virtual room or the second virtual room may include but not limited to Available, Busy, Away, Offline, and Do not disturb.

In another embodiment, the server 110 may be configured to provide the first agent 104 with a list of options to select the appropriate availability status of the first virtual room. In yet another embodiment, the server 110 may be configured to display, on the first user processing system 114, an availability status associated with the first agent 104, wherein the availability status comprises of Available, Away, Busy, Do Not Disturb, and Offline.

In an embodiment, the server 110 may be configured to store a historical data related to at least one first video call or at least one third video call between first user 112 and the first agent 104 or the second agent 108. The historical data comprises information on the duration of the at least one first video call or at least one third video call between the first user 112 and the first agent 104 or the second agent 108. Further, upon allowing the first user 112 into the first virtual lounge and when the availability status of the first agent 104 and the second agent 108 is other than Available, the server 110 may be configured to generate a waiting time based on the historical data when the first user 112 is in the first virtual room or the second virtual room, wherein the waiting time is the time taken to allow a second user 112 into the first virtual room or the second virtual room. Further, the server 110 may be configured to notify the second user of the waiting time, when the second user is in the first virtual lounge.

In an embodiment, upon allowing the first user 112 into the first virtual lounge and when the availability status of the first agent 104 and the second agent 108 is other than Available, the server 110 may be configured to allow the first user 112 to record a message. Further, the server 110 may be configured to notify any one of the first agent 104 or the second agent 108 regarding the message, when the availability status of any one of the first agent 104 or the second agent 108 updates to Available. The message herein may include but not be limited to, a SMS, email, recorded audio or recorded video, a text message, etc.

In an embodiment, upon allowing the first user 112 into the first virtual lounge and when the availability status of the first agent 104 and the second agent 108 is other than Available, the server 110 may be configured to monitor the availability status of the first agent 104 and the second agent 108 and establish a secured connection between the first user 112 and the first agent 104, when the availability status of the first agent 104 updates to Available before the second agent 108.

In an embodiment, the server 110 may be configured to determine a performance metric for the plurality of agents. The first agent 104 and the second agent 108 among the plurality of users may be ranked based on their performance metric.

The performance metric may be based on factors, such as, but not limited to, response time, issue resolution rate, customer satisfaction scores, click-through rates, conversion rates, revenue generated through recommended products, and wait times of each of the agents. The performance metric may help in decision-making processes, such as assigning tasks or resources to agents with higher rankings, further improving the overall quality of service or performance of the system 100.

In an embodiment, upon allowing the first user 112 into the first virtual lounge and when the availability status of the first agent 104 and the second agent 108 is Available, the server 110 may be configured to display the performance metric of the first agent 104 and the second agent 108 to the first user 112. Further, the server 110 may be configured to receive a seventh input from the first user 112. The seventh input may allow the first user 112 to choose between the first agent 104 and the second agent 108.

In an embodiment, upon allowing the first user 112 into the first virtual lounge and when the availability status of the first agent 104 and the second agent 108 is Available, the server 110 may be configured to allow the first user 112 into the first virtual room, wherein the performance metric of the first agent 104 is higher than the performance metric of the second agent 108.

In an embodiment, upon allowing the first user 112 into the first virtual lounge and when the availability status of the first agent 104 and the second agent 108 is other than Available, the server 110 may be configured to allow the first user 112 to record a message. Further, the server 110 may be configured to notify the first agent 104 regarding the recorded message, wherein the performance metric of the first agent 104 is higher than the performance metric of the second agent 108. Further, the server 110 may then notify the first user 112 regarding the received message by the first agent 104.

In an embodiment, the first user processing system 114 may be configured to create a first user virtual room and a first user virtual lounge. The first user virtual lounge may be uniquely associated with the first virtual room associated with the first user 112.

In an embodiment, the server 110 may be configured to provide the first agent 104, access to the first user virtual lounge. The server 110 may further be configured to notify the first user 112, the presence of the first agent 104 in the first user virtual lounge. Upon receiving the notification, the server 110 may be configured to receive an eight input from the first user 112 to allow or disallow the first agent 104 into the first user virtual room.

In an embodiment, the server 110 may comprise of a blacklist, wherein the server 110 may be configured to allow the first agent 104 or the second agent 108 to 'Add' the first user 112 to the blacklist. Further, the server 110 may be configured to allow the first agent 104 or the second agent 108 to 'Remove' the first user 112 from the blacklist. The first agent 104 or the second agent 108 may be allowed to 'Add' or 'Remove' the first user 112 from the blacklist, if, but not limited to, misconduct by the first user 112, rude/bad behaviour by the first user 112, and spammers. The server 110 may be configured to disallow the plurality of users 'Added' to the blacklist, into the one or more virtual lounges.

Example-1

According to an example, considering a scenario wherein there exists a company known as "XYZ", comprising 25 agents. Said 25 agents within the XYZ organization may be categorized into two or more distinct groups, namely Group-1, Group-2, and Group-3, each responsible for handling different departments. For instance, Group-1 may be tasked with providing user support services, while Group-2 may be responsible for addressing finance-related issues. Additionally, Group-3 may be designated to manage tasks such as supporting installations, customizations, maintenance, and product upgrades, among others. The server 110 may be configured to create a virtual lounge for each of the groups, namely, Group-1 virtual lounge, Group-2 virtual lounge, Group-3 virtual lounge, and so on. The server 110 may be configured to host one or more of virtual rooms associated with each of the 25 agents.

Now, in the event that a user named Harry, associated with Harry's system wishes to initiate a conversation with Group-1, the server 110 is configured to establish a connection with Harry's system. Consequently, the server 110 initiates a connection between Harry's system and the Group-1 virtual lounge. Upon successful authentication of Harry's credentials by the server 110, the server 110 may be configured to allow Harry into the Group-1 virtual lounge. John and Alex belonging to Group-1, may receive a notification from the server 110, notifying the presence of Harry in the Group-1 virtual lounge. When John allows Harry into the virtual room associated with John, the server 110 notifies Alex that Harry has exited the Group-1 virtual lounge. Moreover, upon establishing a secured connection between Harry's system and John, the server 110 may be configured to initiate a video call between Harry and John.

Example-2

In a continuation example, upon initiating the video call between Harry and John, Harry wishes to communicate with Alex alongside John. The server 110 may be configured to allow Alex into the virtual room associated with John and Harry.

Example-3

According to another example, Harry, during the video call with John, wishes to enter the Group-2 virtual lounge, to inquire about finance-related matters. Group-2 includes Clark and Peter. The server 110 may be configured to redirect Harry to the Group-2 virtual lounge. Clark and Peter may receive a notification from the server 110, notifying the presence of Harry in the Group-2 virtual lounge. When Clark allows Harry into the virtual room associated with Clark, the server 110 notifies Peter that Harry has exited the Group-2 virtual lounge. Moreover, upon establishing a secured connection between Harry's system and Clark, the server 110 may be configured to initiate a video call between Harry and Clark.

Example-4

In an embodiment, let us consider a scenario where Jordan and Edward two among the ten users waiting in the Group-1 virtual lounge, wherein Jordan was allowed into the Group-1 virtual lounge before Edward. The availability status of John and Alex, indicates as Busy, to the ten users waiting in the Group-1 virtual lounge. If the availability status of John is updated to Available before the availability status of Alex is updated to Available, the server 110 may be configured to allow Jordan into the virtual room associated with John.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and process or method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A system for personalized user engagement and assistance, the system comprising:

a first agent processing system associated with a first agent, wherein the first agent processing system is configured to create a first virtual room uniquely associated with the first agent;

a second agent processing system associated with a second agent, wherein the second agent processing system is configured to create a second virtual room uniquely associated with the second agent;

a first user processing system associated with a first user; and a server, comprising one or more processors configured to:

host the first virtual room and the second virtual room created by the first agent processing system and second agent processing system, respectively;

create and associate a first virtual lounge with the first virtual room and the second virtual room;

provide the first user, access to the first virtual lounge upon establishing a secured connection between the first user processing system and the server;

establish a secured connection between the first user processing system and any one of the first agent processing system or the second agent processing system upon receiving a first input from any one of the first agent processing system or the second agent processing system and allow the first user into the first virtual room; and notify the second agent when:

the first user leaves the first virtual lounge; or the first user enters the first virtual room.

2. The system according to claim 1, wherein the server is configured to notify the first agent and the second agent of the presence of the first user in the first virtual lounge.

3. The system according to claim 1, wherein the system comprising:

a third agent processing system associated with a third agent, wherein the third agent processing system is configured to create a third virtual room uniquely associated with the third agent;

a fourth agent processing system associated with a fourth agent, wherein the fourth agent processing system is configured to create a fourth virtual room uniquely associated with the fourth agent, wherein the server is configured to:

host the third virtual room and the fourth virtual room created by the third agent processing system and fourth agent processing system, respectively;

create and associate a second virtual lounge with the third virtual room and the fourth virtual room;

receive a second input from the first user; and provide the first user access to the second virtual lounge, wherein the second input comprises request to enter the second virtual lounge.

4. The system according to claim 3, wherein upon establishing the secured connection between the first user processing system and the first agent processing system, the server is configured to initiate a first video call between the first user and the first agent.

5. The system according to claim 4, wherein the server, upon receiving a third input from the first agent, is configured to:

disconnect the first video call between the first agent and the first user;

disconnect the secured connection between the first user processing system and the first agent processing system;

transfer the first user from the first virtual room to the second virtual lounge;

establish a secured connection between the first user processing system and any one of the third agent processing system or the fourth agent processing system upon receiving a fourth input from any one of the third agent or the fourth agent; and establish a second video call between the first user processing system and any one of the third agent processing system or the fourth agent processing system.

6. The system according to claim 4, wherein the server, upon receiving a fifth input from the first agent, is configured to:

disconnect the first video call between the first agent and the first user;

disconnect the secured connection between the first user processing system and the first agent processing system;

transfer the first user from the first virtual room to the first virtual lounge;

establish a secured connection between the first user processing system and the second agent processing system and allow the first user into the second virtual room; and establish a third video call between the first user processing system and the second agent processing system.

7. The system according to claim 4, wherein the server is configured to:

provide plurality of users, access to the first virtual lounge upon establishing a secured connection between plurality of user processing systems and the server, wherein each of the plurality of user processing systems is associated with each of the plurality of users;

provide a second user among the plurality of users access to the first virtual room, when the first agent allows the second user into the first virtual room, wherein:

a first secured connection is established between second user processing system and the first agent processing system; and a fourth video call is initiated between the second user and the first agent;

receive a sixth input from the first agent to disconnect the first video call between the first agent and the first user;

transfer the second user from the first virtual room to the first virtual lounge; and provide access to a third user among the plurality of users when the first agent allows the third user into the first virtual room, wherein:

a second secured connection is established between third user processing system and the first agent processing; and a fifth video call is initiated between the third user and the first agent.

8. The system according to claim 4, wherein the server is configured to display, on the first user processing system, an availability status associated with the first agent, wherein the availability comprises of Available, Away, Busy, Do Not Disturb and Offline.

9. The system according to claim 8, wherein upon allowing the first user into the first virtual lounge, when the availability status of the first agent and the second agent is other than Available, the server is configured to:

store a historical data related to at least one first video call or at least one third video call between first user and the first agent or the second agent, wherein the historical data comprises information on the duration of the at least one first video call or at least one third video call between the first user and the first agent or the second agent;

generate a waiting time based on the historical data when the first user is in the first virtual room or the second virtual room, wherein the waiting time is the time taken to allow a second user into the first virtual room or the second virtual room; and notify the second user of the waiting time, when the second user is in the first virtual lounge.

10. The system according to claim 8, wherein upon allowing the first user into the first virtual lounge, when the availability status of the first agent and the second agent is other than Available, the server is configured to:

allow the first user to record a message; and notify any one of the first agent or the second agent regarding the message, when the availability status of any one of the first agent or the second agent updates to Available.

11. The system according to claim 8, wherein upon allowing the first user into the first virtual lounge, when the availability status of the first agent and the second agent is other than Available, the server is configured to:

monitor the availability status of the first agent and the second agent; and establish a secured connection between the first user and the first agent, when the availability status of the first agent updates to Available before the second agent.

12. The system according to claim 8, wherein the server is configured to determine a performance metric for the first agent and the second agent, wherein the first agent and the second agent are ranked based on the performance metric.

13. The system according to claim 12, wherein when:

the first user is allowed into the first virtual lounge; and the availability status of the first agent and the second agent is Available, the server is configured to:

display the performance metric of the first agent and the second agent to the first user; and receive a seventh input from the first user, wherein the seventh input allows the first user to choose between the first agent and the second agent.

14. The system according to claim 12, wherein when:

the first user is allowed into the first virtual lounge; and the availability status of the first agent and the second agent is Available, the server is configured to allow the first user in to the first virtual room, wherein the performance metric of the first agent is higher than the performance metric of the second agent.

15. The system according to claim 12, wherein upon allowing the first user into the first virtual lounge, when the availability status of the first agent and the second agent is other than Available, the server is configured to:

allow the first user to record a message;

notify the first agent regarding the recorded message, wherein the performance metric of the first agent is higher than the performance metric of the second agent; and notify the first user regarding the received message by the first agent.

16. The system according to claim 1, wherein:

the first user processing system is configured to create a first user virtual room associated uniquely with the first user; and the server is configured to create and associate a first user virtual lounge to the first user virtual room.

17. The system according to claim 16, wherein the server is configured to:

provide the first agent, access to the first user virtual lounge;

notify the first user presence of the first agent in the first user virtual lounge; and receive an eighth input from the first user to allow the first agent into the first user virtual room.

18. The system according to claim 1, wherein the processor is configured to:

receive a ninth input from the first agent processing system during the secured connection between the first user processing system and the first agent processing system, the ninth input corresponds to a request to include the second agent in the first virtual room; and establish a connection between the second agent processing system and the first virtual room to allow the second agent to participate in a fifth video call alongside the first agent and the first user.

19. A method for personalized user engagement and assistance, the method comprising:

associating a first agent processing system to a first agent, wherein the first agent processing system is configured to create a first virtual room uniquely associated with the first agent;

associating a second agent processing system to a second agent, wherein the second agent processing system is configured to create a second virtual room uniquely associated with the second agent;

associating a first user processing system to a first user;

hosting, by a server, the first virtual room and the second virtual room created by the first agent processing system and second agent processing system, respectively;

creating and associating, by the server, a first virtual lounge with the first virtual room and the second virtual room;

providing access to the first user, by the server, to the first virtual lounge upon establishing a secured connection between the first user processing system and the server;

establishing a secured connection, by the server, between the first user processing system and any one of the first agent processing system or the second agent processing system upon receiving a first input from any one of the first agent processing system or the second agent processing system and allow the first user into the first virtual room; and notifying the second agent when the first user leaves the first virtual lounge or when the first user enters the first virtual room.

* * * * *